S. J. BERNHEIMER.
MOTOR TRUCK.
APPLICATION FILED NOV. 4, 1914.
1,141,924.
Patented June 8, 1915.
2 SHEETS—SHEET 1.
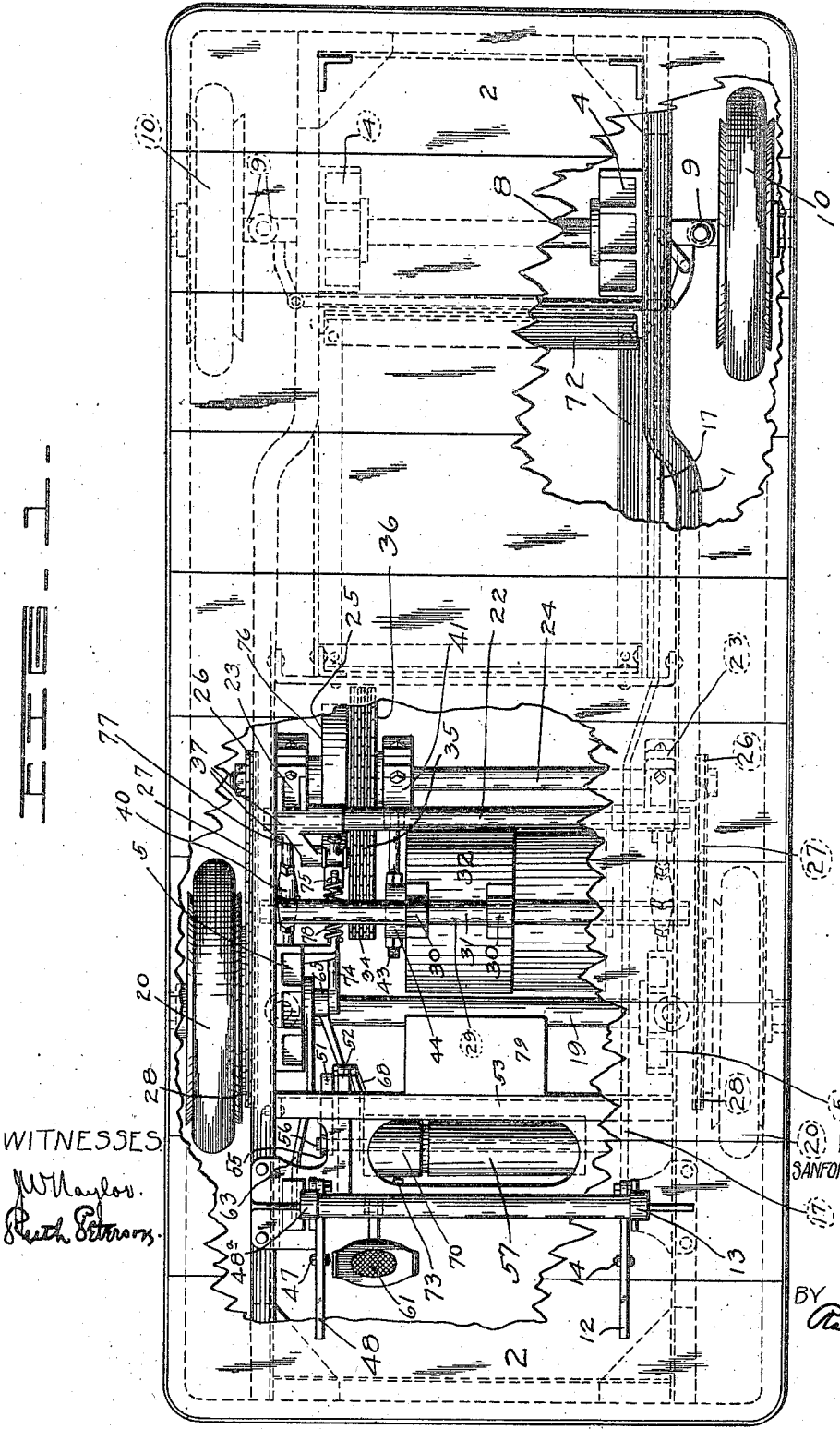
WITNESSES
INVENTOR.
SANFORD J. BERNHEIMER.
BY
ATT'Y

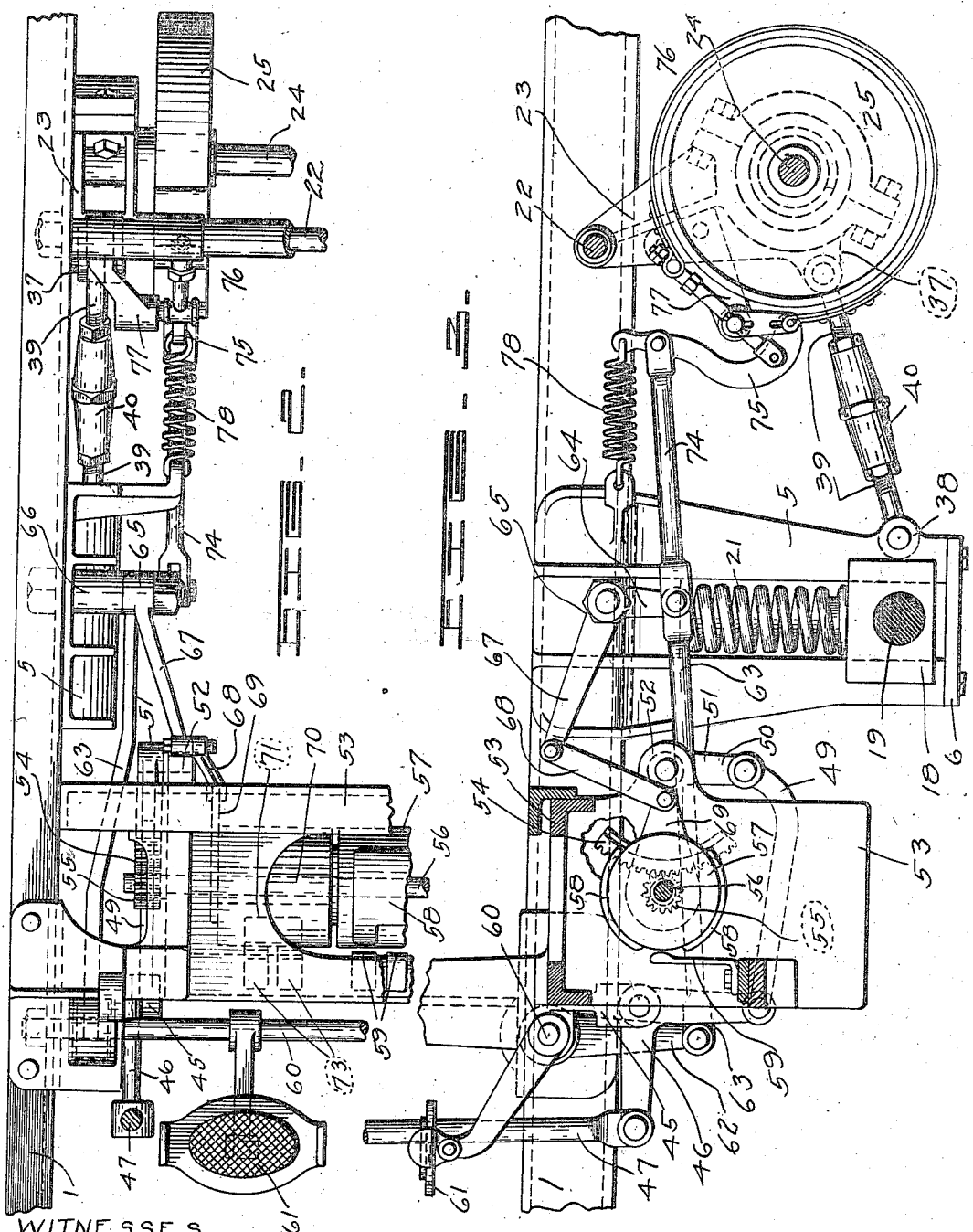

1,141,924.

Specification of Letters Patent.

Patented June 8, 1915.

UNITED STATES PATENT OFFICE.

SANFORD J. BERNHEIMER, OF ST. LOUIS, MISSOURI, ASSIGNOR TO THE ELECTRO-MOBILE COMPANY, OF ST. LOUIS, MISSOURI, A CORPORATION OF DELAWARE.

MOTOR-TRUCK.

Original application filed June 12, 1913, Serial No. 773,366. Divided and this application filed November 4, 1914. Serial No. 870,234.

*To all whom it may concern:*

Be it known that I, SANFORD J. BERNHEIMER, a citizen of the United States, residing at the city of St. Louis, State of Missouri, have invented a certain new and useful Improvement in Motor-Trucks, (being a division from my application for Letters Patent for motor-trucks filed June 12, 1913, Serial No. 773,366,) of which the following is a specification, reference being had to the accompanying drawings, forming a part thereof.

This invention relates generally to motor trucks and, more particularly, to a certain new and useful improvement in that class of motor trucks known commercially as industrial or baggage trucks, the principal object of my present invention being to provide a motor truck of the kind stated having means for simultaneously actuating the braking-mechanism thereof to off and on position and closing and opening the electrical circuit to the source of electrical energy or motive power of the truck.

With the above and other objects in view, my present invention resides in certain novel features of form, construction, arrangement, and combination of parts, all as will hereinafter be described, and afterward pointed out in the claim.

In the accompanying drawings, which show the preferred embodiment of my invention, Figure 1 is a plan view of a motor truck equipped with my invention, the platform of the truck being partly broken away to show the running gear and steering and brake mechanism; Fig. 2 is a detail plan view, somewhat enlarged, of a portion of my new motor truck with the platform removed; and Fig. 3 is a side elevational view, also somewhat enlarged, of a portion of the truck, the platform being removed and parts being shown in section.

In the said drawings, in which like reference characters refer to like parts throughout the several views, 1 indicates the body-frame of the truck, which is, as is usual, formed of suitable channel side and end members riveted or otherwise fixed together at their ends, the flanges thereof being preferably presented outwardly. Fixed upon frame 1 is a platform 2. Suitably riveted or otherwise fixed to the side members of frame 1 are pairs of rigid longitudinally slotted front and rear axle pedestal-members 4—4 and 5—5, respectively, each of which is preferably provided with a removable end or cross-piece 6 forming one of the walls of the slot therein, as shown particularly in Fig. 3.

Supported at its ends in the slots of front pedestals 4—4, is a non-rotatable axle 8 provided with suitable steering knuckles-and-axles 9—9 having journaled for rotation thereupon suitable front or steering wheels 10—10. By means of a suitable hand-lever 12 pivoted at one end to an upstanding member 13 fixed on frame 1 adjacent the rear and preferably at the right-hand side thereof and having suitable operative connection through rods 14 and 17 with steering knuckles-and-axles 9—9, wheels 10—10 may be steered or guided as desired.

Arranged in the slots of rear pedestals 5—5 are box-shaped heads 18—18 preferably pressed on and forming part of a non-rotatable axle 19 having journaled for rotation thereupon suitable driving wheels 20—20. Interposed in the slots of pedestals 5 above and upon heads 18 are suitable coiled or helical springs 21, whereby frame 1 is resiliently supported upon, and permitted to yield or resiliently move vertically relatively to, rear or driving wheels 20 to take up any shocks or jars to which said wheels may be subjected in the running or operation of my new truck.

Pivotally suspended on a transversely-extending shaft 22 supported by the side members of frame 1 at a suitable point forwardly of rear pedestals 5 are suitable split-hangers 23 supporting and in which is journaled for rotation a shaft 24 extending transversely of frame 1. Shaft 24 is preferably formed in two parts, the parts thereof extending end to end and being united or connected together by a suitable differential 25 of any ordinary or approved construction. Fixed to shaft 24 to rotate therewith and adjacent each of the side members of frame 1 are gears or sprocket wheels 26—26 having connection by means of suitable chains 27—27 with larger gears or sprocket-wheels 28—28 fixed on the inner faces of driving-wheels 20—20.

Suitably supported at its ends on the side members of frame 1 and at a point intermediate rear axle 19 and shaft 24, is a motor-supporting bar 29, and swingably hung on bar 29 by means of suitable lugs or the like 30 maintained in proper position on bar 29 by means of suitable spacing members 31 sleeved on bar 29 between the side members of frame 1, is an electric motor 32 of any suitable or approved construction.

Fixed on the armature shaft of motor 32 is a gear or sprocket 34 having connection by means of a suitable chain 35 with a larger gear or sprocket 36 fixed on differential 25. By means of sprocket-wheels 34 and 36 and their connecting chain 35, differential 25 will be operated and driving or jack-shaft 24 rotated on the operation of the motor 32, rear wheels 20—20 being correspondingly driven through sprockets 26 and 28 and their connecting chains 27.

Hangers 23 are each provided with a rearwardly projecting lug or portion 37, and pivotally connected at one end to each of said lugs 37 and at its other end to, and at a fixed point, as at 38, upon adjacent pedestal 5 is a two-piece distance-rod 39 having its members adjustably connected by means of a turn-buckle or sleeve 40. By means of distance-rods 39 and their adjusting members 40, it will be obvious that driving or jack-shaft 24 will be maintained in proper operative position relatively to driving-wheels 20—20 and that the position of driving-shaft 24 relatively to driving-wheels 20 may be swingably altered or changed and the tension of driving-chains 27 correspondingly adjusted.

Journaled on driving or jack-shaft 24 intermediate hangers 23 is a suitable two-piece or split collar 41 having a rearwardly extending lug or portion 42, in which is pivoted one end of a short bar or rod 43 adjustably fitting at its other end in a member 44 fixed on the hub of motor 32. By means of bar or rod 43, motor 32 and differential 25 are maintained in proper operative position relatively to each other and the tension of differential driving-chain 35 readily adjusted.

Suitably pivoted on a bracket or the like 45 fixed to frame 1 adjacent the rear end and preferably at the left-hand side thereof, is a bell-crank lever 46, to one arm of which is pivoted at its lower end an upstanding operating rod 47 pivotally connected at its upper end to an operating handle 48 substantially identical with steering-lever 12 and likewise pivotally connected at one end to an upstanding member 48ª fixed on frame 1 and similar to said upright 13. Pivotally connected at its rear end to the other arm of bell-crank lever 46 is a forwardly presented link 49 preferably curved upwardly at its forward end and there pivotally connected to an arm 50 of a bell-crank lever 51 pivotally mounted on an arm or bracket 52 fixed to a controller-frame 53 fixed to and supported by frame 1. The other arm 54 of bell-crank lever 51 is substantially in the form of a segmental spur-gear or sector which meshes with a gear 55 fixed on a shaft 56 mounted in suitable bearings in controller-frame 53 and having fixed thereto within controller-frame 53 a cylinder 57 provided on its periphery with a plurality of starting and speed contact-members 58 adapted to contact, on the rotation of cylinder 57, with a plurality of fixed starting and speed contact-members 59 suitably mounted on controller-frame 53 and having suitable electrical connection through a rheostat 79 with motor 32.

Extending transversely of frame 1 adjacent the rear end, and journaled in suitable bearings on the side members, thereof, is a shaft 60 having fixed thereto a suitable foot-lever 61. Fixed at one end to shaft 60 and depending therefrom is an arm or lever 62 pivotally connected at its lower end to the rear end of a forwardly presented link or rod 63 pivotally connected at its forward end to an arm 64 of a bell-crank lever 65 pivotally mounted on a suitable bracket 66 fixed to body-frame 1. The other arm 67 of bell-crank lever 65 is pivotally connected by means of a connecting link 68 with a member 69 fixed to a switch-cylinder 70 loose on shaft 56 and provided on its periphery with a switch-contact-member 71 adapted, on the rotation of cylinder 70, to electrically contact with fixed switch contact-members 73—73 suitably mounted on controller-frame 53, one of said contact-members 73 having suitable electrical connection with a storage battery or other source of electrical energy (not shown) carried by a skeleton cradle 72 fixed to body-frame 1, as seen particularly in Fig. 1, and the other of said contact-members 73 being in electrical circuit with said controller contact-members 59.

Pivotally connected at its rear end to arm 64 of bell-crank lever 65 is a link or rod 74 pivotally connected at its forward end to a brake-cam 75 operatively connected to a suitable band-brake mechanism 76 operating upon the drum of differential 25 and having suitable pivoted connection with an arm or bracket 77 fixed to adjacent hanger 23, as seen in Figs. 2 and 3. Having one end connected or attached to brake-cam 75 and its other end to adjacent rear pedestal 5 or other fixed point of frame 1, as shown in Fig. 3, is a coiled spring 78. Normally spring 78 is adapted to maintain brake mechanism in braking engagement with the drum of differential 25; normally also the circuit to the storage battery or other source of electrical energy carried by the truck is broken, operating handle 48 on rod 47 being in substantially horizontal position relatively to the plane of body-frame 1 and foot-lever 61 being in uppermost position, or in the position thereof shown particularly in Fig. 3. To start the truck, foot-lever 61 is actuated or depressed by the operator, whereupon through arm 62, link 63, bell-crank lever 65, link 68, and member 69, switch-cylinder 70 will be rotated on shaft 56 and switch contact-member 71 brought into electrical engagement with fixed switch contact-members 73, the circuit from the storage battery being thereby completed to the motor 32 through controller-cylinder 57; at the same time, through link 74, brake-cam 75 will be pivotally moved against the tension of spring 78 and braking mechanism 76 thereby released from braking engagement with the drum of differential 25, driving-shaft 24 and its differential 25 being then free to rotate. Now, through said operating handle 48, rod 47 is pivotally moved upwardly or downwardly, depending upon whether it be desired the truck go forward or backward, to rotate cylinder 57 to bring movable speed and controlling contact-members 58 into electrical engagement with fixed speed or controlling contact-members 59 and thereby complete the circuit to motor 32, this movement of cylinder 57 being accomplished through bell-crank 46, link 49, arm 50, and the meshing engagement of segmental spur-gear 54 with said gear 55 fixed on shaft 56. To stop the truck, the operator's foot need only be removed from foot-lever 61, whereupon, through said spring 78, braking mechanism 76 will be at once thrown into braking engagement with the drum of differential 25 and cylinder 70 at the same time reversely actuated, electrical connection with said storage battery being thereby broken; afterward said operating lever 48 is brought to normal position and speed and controlling contact-members 58 and 59 thereby thrown out of electrical engagement. As is usual, a suitable interlocking device may be provided between cylinders 57 and 70 to prevent switch-cylinder 70 being rotated to "on" position until operating lever 48 has been returned to, or is in, normal position.

I am aware that changes in the form, construction, arrangement, and combination of the several parts of my invention may be made and substituted for those herein shown and described without departing from the nature and spirit thereof.

Having thus described my invention, what I claim and desire to secure by Letters Patent is:

In a motor truck, a drive-shaft, a source of electrical energy, a motor, a normally open electric circuit between said motor and source of electrical energy, said circuit including a switch having a rotatably movable member, a brake mechanism for said shaft, a spring yieldingly maintaining said brake mechanism normally in braking engagement with said shaft, and means on the truck adapted to simultaneously release said brake mechanism against the tension of said spring and actuate said switch-member to close the circuit between said motor and source of electrical energy, said means including a lever, a pivoted bell-crank lever, a rod pivotally connected to said lever and to one arm of said bell-crank lever, a second rod pivotally connected to said brake mechanism and to said mentioned arm of said bell-crank lever, and a link pivotally connected to said switch member and to the other arm of said bell-crank lever.

In testimony whereof, I have signed my name to this specification, in the presence of two subscribing witnesses.

SANFORD J. BERNHEIMER.

Witnesses:
RUTH PETERSON,
EDGAR LITTMANN.